(12) United States Patent
Ullman

(10) Patent No.: US 8,870,122 B2
(45) Date of Patent: Oct. 28, 2014

(54) METHOD AND APPARATUS FOR CONTROLLING FLOW ABOUT A TURRET

(75) Inventor: Alan Z. Ullman, Northridge, CA (US)

(73) Assignee: The Boeing Company, Chicago, IL (US)

( * ) Notice: Subject to any disclaimer, the term of this patent is extended or adjusted under 35 U.S.C. 154(b) by 229 days.

(21) Appl. No.: 12/842,534

(22) Filed: Jul. 23, 2010

(65) Prior Publication Data
US 2012/0018004 A1    Jan. 26, 2012

(51) Int. Cl.
*B64C 1/38* (2006.01)
(52) U.S. Cl.
USPC .......................................................... 244/130
(58) Field of Classification Search
USPC ............... 244/130, 204, 204.1, 200, 207, 208
See application file for complete search history.

(56) References Cited

U.S. PATENT DOCUMENTS

| | | | | |
|---|---|---|---|---|
| 2,500,712 | A * | 3/1950 | Serrell ............................. | 60/224 |
| 2,951,662 | A * | 9/1960 | Theodorsen .................. | 244/207 |
| 2,973,922 | A * | 3/1961 | Davidson et al. .............. | 244/15 |
| 3,085,740 | A * | 4/1963 | Wagner ......................... | 417/176 |
| 3,441,236 | A * | 4/1969 | Arnholdt ....................... | 244/204 |
| 5,775,643 | A * | 7/1998 | McMaster et al. ............ | 244/130 |
| 5,806,789 | A | 9/1998 | Boulware et al. | |
| 6,105,904 | A * | 8/2000 | Lisy et al. ................... | 244/200.1 |
| 6,186,445 | B1 * | 2/2001 | Batcho .......................... | 244/130 |
| 6,409,126 | B1 * | 6/2002 | Cunningham, Jr. ........... | 244/130 |
| 6,758,032 | B2 | 7/2004 | Hunter et al. | |
| 7,028,954 | B2 * | 4/2006 | Van Dam et al. ............. | 244/204 |
| 7,159,383 | B2 * | 1/2007 | Barton et al. ................ | 60/226.1 |
| 7,673,832 | B2 * | 3/2010 | Meister ....................... | 244/123.1 |
| 2002/0134891 | A1 * | 9/2002 | Guillot et al. ................. | 244/199 |
| 2004/0237501 | A1 * | 12/2004 | Brice et al. ....................... | 60/204 |
| 2007/0095987 | A1 * | 5/2007 | Glezer et al. ............... | 244/200.1 |
| 2009/0052478 | A1 * | 2/2009 | Vassberg et al. ................... | 372/9 |
| 2010/0078863 | A1 * | 4/2010 | Ullman et al. ............. | 267/140.5 |
| 2010/0176692 | A1 | 7/2010 | Shmilovich et al. | |

FOREIGN PATENT DOCUMENTS

| | | |
|---|---|---|
| FR | 2 783 497 A1 | 3/2000 |
| GB | 703 149 A | 1/1954 |
| WO | WO 2010/080234 A2 | 7/2010 |

OTHER PUBLICATIONS

International Search Report and Written Opinion from International Application No. PCT/US2011/040151, filed Jun. 13, 2011.

* cited by examiner

*Primary Examiner* — Valentina Xavier
(74) *Attorney, Agent, or Firm* — Alston & Bird LLP

(57) ABSTRACT

Methods and apparatus are provided to control flow separation of an ambient flow along a surface and about a turret, such as by reducing flow separation aft of the turret. By reducing flow separation, the resulting turbulence may be similarly reduced such that the performance of a system, such as a laser system, housed by the turret may be improved. To reduce flow separation, a motive flow may be provided by ejector nozzles that open through the surface and are positioned proximate to and aft of the turret relative to the ambient flow. The motive flow has a greater velocity than the ambient flow to thereby create a region aft of the turret of reduced pressure relative to an ambient pressure. Within this region of reduced pressure aft of the turret, a portion of the ambient flow mixes with the motive flow, thereby reducing or eliminating flow separation.

18 Claims, 6 Drawing Sheets

METHOD AND APPARATUS FOR CONTROLLING FLOW ABOUT A TURRET

TECHNOLOGICAL FIELD

Embodiments of the present disclosure relate generally to methods and apparatus for controlling flow and, more particularly, relate to methods and apparatus for controlling flow about a turret, such as a turret that houses one or more components of a laser system.

BACKGROUND

Turrets that extend outwardly from a surface are utilized in a wide variety of applications in order to house one or more components of a system that needs visibility beyond the surface. For example, air vehicles, such as aircraft, may include one or more turrets that extend outwardly from the surface of the aircraft. These turrets may house components of various systems including, for example, components of a laser system, such as optical elements for receiving and steering a laser beam.

To allow orientation of the components within the turret over the complete range of orientations with respect to the aircraft to which the turret is mounted, a turret may have a shape generally described as "hemisphere on cylinder". In this configuration, the cylinder rotates around an axis aligned with the cylinder's axis of symmetry. This axis is aligned generally perpendicular to the aircraft surface to which the turret is mounted. The hemisphere mounted to the cylinder rotates along an axis perpendicular to that around which the cylinder rotates. When used to project a laser beam, the final optical elements, including a window and telescope as required by the application, may be mounted internal to the hemispherical portion of the turret.

Turrets of this configuration create a region of relatively low flow velocity directly aft of the cylindrical portion of the turret. This reduced velocity may create separation of the ambient flow from the surface over which the ambient flow is otherwise propagating due to an adverse pressure gradient created by the relatively higher local pressure in this region of low flow velocity. In this regard, the ambient flow may propagate in a predefined direction relative to the surface, such as based upon the direction of movement of an aircraft and the prevailing wind currents. As such, the turret may create flow separation on the aft side of the turret relative to the predetermined direction of the ambient flow. By way of illustration, FIG. 1 depicts a turret 12 extending outwardly from the surface 14 of an aircraft. In an instance in which the predefined direction of the ambient flow extends in a direction generally from left to right as indicated by the arrows 16 in FIG. 1, the turret 12 may create flow separation in the region 18 aft of, that is, to the right of, the turret, relative to the predefined direction of the ambient flow. As shown in FIG. 1, the flow separation generally begins at about that portion of the turret 12 that is marked with a dashed line 20 and then continues for some distance downstream of the turret. This location at which flow separation begins and the size and shape of the region of flow separation is dependant on factors including the aircraft speed, turret size and design, and local atmospheric conditions.

Flow separation created by a turret 12 produces turbulence which may, in turn, effect the operation of the system housed within the turret. For example, a turret 12 that houses one or more components of a laser system may effect the operation of the laser system by creating the flow separation and, in turn, turbulence in the region 18 aft of the turret, since such turbulence may alter the precision of the laser system. Indeed, the turbulence may effect laser beam propagation, both as a result of the atmospheric turbulence in the propagation path of the laser beam and through the buffeting of the turret 12 by pressure fluctuation in the flow.

In order to avoid the issues created by turrets 12 that extend outwardly from a surface 14, the turret may be positioned on the nose of an aircraft or other air vehicle so as to eliminate flow separation and the attendant turbulence. However, only a limited number of aircraft or air vehicles can accommodate the mounting of a turret on the nose for reasons including structural limitations, interference with other critical systems and mass balance. Therefore turrets 12 that extend outwardly from the surface 14 of an air vehicle may oftentimes still be required.

As another alternative to a turret 12, a fairing may be utilized, but the fairing itself may create issues for the system housed therein. For example, in instances in which one or more components of a laser system are to be housed within a fairing, the fairing would generally be fabricated from a glass having relatively low absorption which may be difficult to obtain in the requisite size and/or may be expensive. Additionally, the fairing may alter the laser beam in a complex way due to its non-spherical shape, thereby further effecting the operation of the laser system.

Alternatively, the components of the system that are otherwise housed by a turret 12 may be disposed under or within the surface 14, such as within an aircraft, and may interact with the exterior environment through a conformal window. However, the use of such a conformal window may effect the field of regard of the system, such as a laser system, thereby altering system performance. Additionally, the use of a conformal window may increase costs and/or may require that additional space be dedicated to the system under or within the surface, such as within the aircraft.

As such, it may be desirable in a number of instances to utilize turrets 12 that extend outwardly from the surface 14 in order to house one or more components of a system, such as a laser system. In instances in which the ambient flow is at a relatively low Mach number (M), such as M=0.3 to 0.4, the turret may include fairing ramps that extend at least partially around the base of the turret proximate to the surface. These fairing ramps cause the velocity of the ambient flow to increase as it moves upwardly along the fairing ramp and around the turret, and can also induce vorticity into the flow. The fairing ramps may extend around both sides of the turret and may terminate with a tapered rear-facing step on the aft side of the turret. The termination of the fairing ramps may generate counter-rotating vortices that may produce suction aft of the turret due to their relatively high velocity with respect to the ambient flow around the turret. This suction may eliminate or at least reduce the adverse pressure gradient aft of the turret which, in turn, may prevent or at least reduce flow separation and the resulting turbulence aft of the turret.

While useful in instances in which the ambient flow has a relatively low Mach number, the fairing ramps may not efficiently reduce flow separation as the velocity of the ambient flow increases, such as to transonic speeds. In this regard, a transonic flow is generally a subsonic flow that may become sonic in one or more local regions. In this instance in which the ambient flow is transonic, the flow along the fairing ramps may create shock waves which, in turn, may create relatively large density gradients which may adversely affect the performance of the system housed by the turret.

As such, it may be desirable to provide an improved technique for reducing or eliminating flow separation aft of a turret that is operational at higher speeds, including, for example, transonic speeds in which the ambient flow has a Mach number of about 0.7 to 0.9. By reducing or eliminating the flow separation, the resulting turbulence can be similarly reduced or eliminated so as to avoid alteration of the performance of a system, such as a laser system, housed by the turret.

BRIEF SUMMARY

Methods and apparatus are therefore provided according to embodiments of the present disclosure in order to control flow separation about a turret, such as by reducing flow separation aft of the turret. By reducing or eliminating flow separation, the resulting turbulence may be similarly reduced or eliminated such that the performance of a system, such as a laser system, housed by the turret may be improved. In one embodiment, the methods and apparatus provide for control of flow separation and the resulting turbulence in instances in which the ambient flow is transonic.

In one embodiment, an apparatus for controlling flow is provided that includes a turret extending outwardly from a surface and into an ambient flow that propagates in a predefined flow direction relative to the surface in the turret. The apparatus of this embodiment also includes a plurality of ejector nozzles opening through the surface and positioned proximate to and aft of the turret relative to the ambient flow. The plurality of ejector nozzles is configured to introduce a motive flow having a greater velocity than the ambient flow. This motive flow accelerates a portion of the ambient flow proximate to the turret to a higher velocity than the remainder of the ambient flow by a mixing process between the motive flow and the accelerated ambient flow. The accelerated ambient flow has a reduced pressure and creates a region aft of the turret of reduced pressure relative to an ambient pressure. The reduced pressure aft of the turret prevents the formation of an adverse pressure gradient as flow goes around the turret, and therefore prevents flow separation and the resultant turbulent flow aft of the turret.

In another embodiment, an apparatus for controlling flow is provided that includes a turret extending outwardly from a surface and into an ambient flow that propagates in a predefined flow direction relative to the surface and one or more components of a laser system disposed within the turret. The apparatus of this embodiment also includes a plurality of ejector nozzles opening through the surface and positioned proximate to and aft of the turret relative to the ambient flow. The plurality of ejector nozzles are configured to introduce a motive flow having a greater velocity than the ambient flow to thereby create a region aft of the turret having a reduced pressure relative to an ambient pressure.

Each ejector nozzle may include an inner nozzle through which motive gas is introduced and a throat surrounding the inner nozzle through which suction gas is introduced at a different pressure than the motive gas. The motive gas and the suction gas may combine to create the motive flow. In this embodiment, each ejector nozzle may include a gas generator for providing motive gas at a temperature greater than an ambient temperature of the ambient flow. In this embodiment, the inner nozzle and the throat may be configured such that the motive gas has a greater temperature and a lower molecular weight than the suction gas.

In one embodiment in which the ambient flow is transonic, the plurality of ejector nozzles may be configured to introduce the motive flow at a supersonic velocity. The apparatus of one embodiment may also include a flow redirectors, such as a ramp, positioned aft of the turret and extending outwardly from the surface to further control the flow over the surface aft of the turret.

In another embodiment, a method for controlling flow is provided that establishes an ambient flow that propagates in a predefined flow direction about a turret that extends outwardly from a surface and into the ambient flow. The method of this embodiment also introduces a motive flow from a plurality of ejector nozzles that open through the surface and are positioned proximate to and aft of the turret relative to the ambient flow. The motive flow has a greater velocity than the ambient flow to thereby create a region aft of the turret of reduced pressure relative to an ambient pressure. Within this region of reduced pressure aft of the turret, a portion of the ambient flow mixes with the motive flow.

The introduction of the motive flow may include introducing a motive gas through an inner nozzle of each ejector nozzle and introducing a suction gas through a throat of each ejector nozzle that surrounds the respective inner nozzle. The suction gas may be introduced at a different pressure than the motive gas such that the motive gas and the suction gas combine to create the motive flow. In this embodiment, the introduction of the motive gas may include the provision of motive gas at a temperature greater than an ambient temperature of the ambient flow. In this embodiment, the introduction of the motive gas and the suction gas may include the introduction of the motive gas at a greater temperature and with a lower molecular weight than the suction gas.

The ambient flow that is established in one embodiment may be transonic. In this embodiment, the motive flow that is introduced may, in turn, have a supersonic velocity. In one embodiment, the method may also include housing one or more components of a laser system within the turret.

In accordance with embodiments of the apparatus and method, the flow aft of a turret may be controlled, such as to reduce or eliminate the turbulence that may otherwise be created. However, the features, functions and advantages that have been discussed may be achieved independently in various embodiments of the present disclosure and may be combined in yet other embodiments, further details of which may be seen with reference to the following description and drawings.

BRIEF DESCRIPTION OF THE SEVERAL VIEWS OF THE DRAWING(S)

Having thus described embodiments of the disclosure in general terms, reference will now be made to the accompanying drawings, which are not necessarily drawn to scale, and wherein:

DETAILED DESCRIPTION

Embodiments of the present disclosure now will be described more fully hereinafter with reference to the accompanying drawing, in which some, but not all embodiments are shown. Indeed, these embodiments may be embodied through many different forms and should not be construed as limited to the embodiments set forth herein; rather, these embodiments are provided so that this disclosure will satisfy applicable legal requirements. Like reference numbers refer to like elements throughout.

Figure 2:
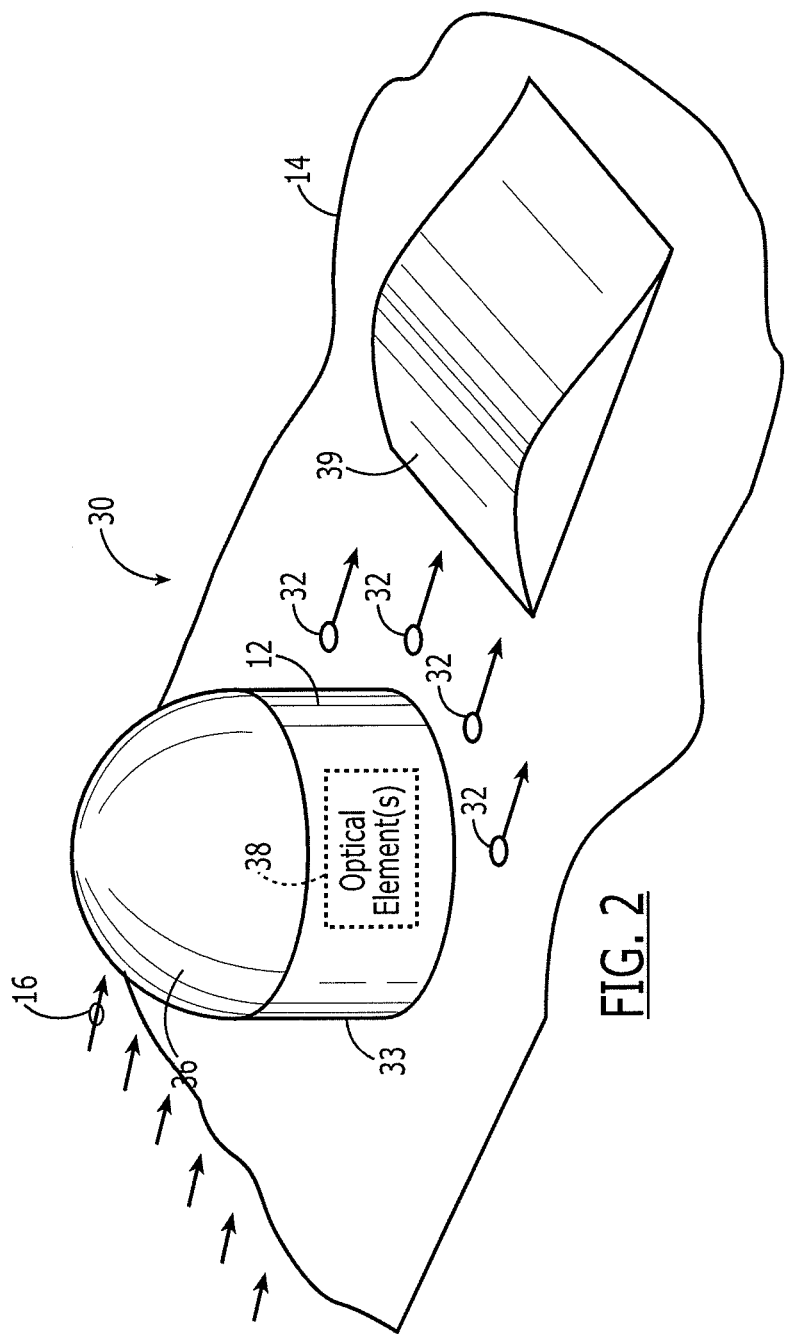
FIG. 2 is a perspective view of an apparatus in accordance with one embodiment of the present disclosure, including a turret and a plurality of ejector nozzles positioned proximate to and aft of the turret.

Referring now to FIG. 2, an apparatus 30 in accordance with one embodiment of the present disclosure is illustrated for controlling flow across a surface 14. As shown, the apparatus 30 includes a turret 12 that extends outwardly from the surface 14 and into an ambient flow. In one embodiment, the surface 14 is the exterior surface of an aircraft fuselage. However, the turret 12 may be mounted upon and extend outwardly from other types of structures, including other types of air vehicles, other types of vehicles in general and other non-vehicular structures. The turret 12 may be mounted to structures internal to the surface 14 and projected through an opening in the surface 14 so that the aerodynamics of the aircraft is not effected by the presence of the turret 12 at all times, and so as to allow other functions of the aircraft to be performed without interference by the turret 12, including take-off and landing operations.

The ambient flow may be a flow of a variety of different types of fluids. In addition, the ambient flow may move across the surface 14 in a predefined flow direction as a result of relative motion between the flow and the structure on which the turret 12 is mounted. In the embodiment in which the turret 12 is mounted upon an aircraft or other air vehicle, the ambient flow is generally an air flow that passes over the surface 14 and around the turret as a result of the relative motion of the aircraft or other air vehicle through the air. As shown in FIG. 2, the ambient flow propagates in a predefined flow direction relative to the surface 14 and the turret 12, such as shown by the rightwardly facing arrows 16 in FIG. 2.

The turret 12 of the illustrated embodiment has a cylindrical portion 33 that is proximate to the surface 14 and a hemispherical portion 36 that defines a distal end of the turret. However, the turret 12 may be sized and shaped in a variety of different manners. The turret 12 may house portions of a variety of different systems. In one embodiment, however, the turret 12 houses at least a portion of a laser system, such as the at least some of the optical elements 38 for receiving and processing a laser beam, as schematically represented in dashed lines in FIG. 2.

Figure 1:
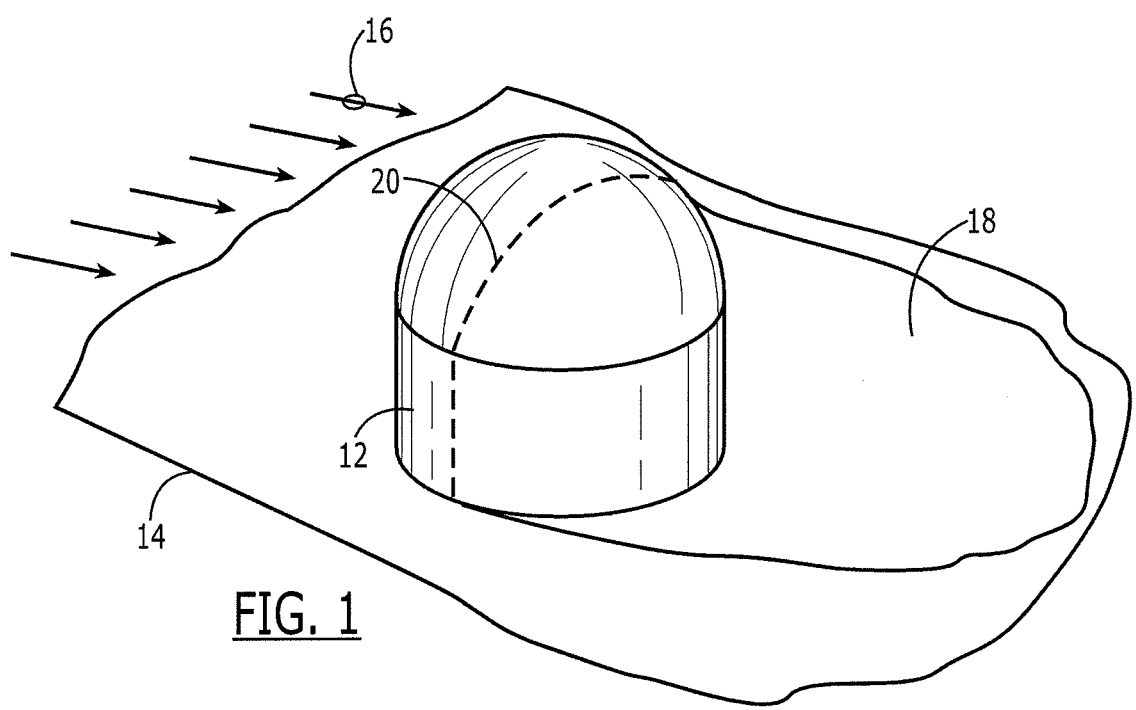
FIG. 1 is a perspective view of a conventional turret that creates flow separation and corresponding turbulence aft of the turret.

As described above, as a result of the ambient flow about the turret 12 that extends outwardly from the surface 14, flow separation from the surface may occur aft of the turret unless measures are taken to reduce or eliminate the flow separation. In accordance with an embodiment of the present disclosure, the apparatus 30 may also include a plurality of ejector nozzles 32 opening through the surface 14 and positioned proximate to and aft of the turret 12 relative to the ambient flow. As described below, the ejector nozzles 32 may create an ejector effect that reduces the pressure on the aft side of the turret 12 and reduces or eliminates flow separation by reducing or eliminating the adverse pressure gradient that otherwise is created aft of the turret. In this regard, the ejector effect may cause the air surrounding the high velocity stream output by an ejector nozzle to be drawn into the stream by entrainment which results in the air being reduced in pressure and accelerated, such as to approximately Mach 1. As described below, the local pressure may then increase in the diffuser section downstream of the ejector nozzles 32. The apparatus 30 may include any number of ejector nozzles 32. Thus, while the illustrated embodiment of the apparatus 30 includes four ejector nozzles 32, the apparatus may include more or fewer ejector nozzles in other embodiments. Additionally, while the ejector nozzles 32 of the illustrated embodiment are positioned in equal angular increments about the turret 12, the ejector nozzles may be positioned in other configurations so long as the ejector nozzles are positioned within the region aft of the turret that otherwise would experience flow separation. Thus, for purposes of defining the region aft of the turret 12 in which the ejector nozzles 32 may be positioned, an imaginary plane may be defined perpendicular to the surface 14 and through the turret with the imaginary plane separating the turret into that portion which faces the ambient flow and that portion that does not face the ambient flow and which is therefore considered aft of the turret. In this regard, the imaginary plane may be defined so as to extend through the turret 12 along the dashed line 20 of FIG. 1 that represents the line along the turret at which flow separation commences. Thus, some of the ejector nozzles 32 may be positioned to the side of the turret 12 relative to the predefined flow direction 16, but are still considered aft of the turret by being positioned downstream of the imaginary plane described above.

In one embodiment, the ejector nozzles 32 introduce a motive flow that accelerates a portion of the ambient flow that otherwise propagates proximate to the respective ejector nozzles, thereby lowering the pressure. The motive flow introduced by the ejector nozzles 32 has a greater velocity, typically a substantially greater velocity, than the ambient flow and, in one embodiment, is supersonic, while the ambient flow is transonic. This supersonic motive flow combines with the ambient flow proximate the ejector nozzles 32 and then undergoes one or more shocks as the combined flow passes through a subsonic diffuser region position aft of the turret so as to return to a subsonic flow condition. This transition to a subsonic flow condition causes the pressure of the combined flow to increase to that the flow may re-combine with the remainder of the ambient flow at the pressure of the ambient flow. By providing an accelerated motive flow, however, the motive flow provided by the ejector nozzles 32 lowers the pressure and creates a partial vacuum aft of the turret 12 which draws a portion of the ambient flow into the region aft of the turret that otherwise may experience flow separation, thereby reducing or eliminating flow separation and the turbulence that may otherwise be created by such flow separation.

To facilitate the combination of the motive flow and a portion of the ambient flow and the movement of the combined flow in the predefined flow direction 16, the ejector nozzles 32 may be angled relative to the surface 14. In this regard, the ejector nozzles 32 may be oriented relative to the surface 14 such that the motive flow introduced by the ejector nozzles propagates not only outwardly from the surface, but also in a downstream direction, that is, in the predefined flow direction 16, of the ambient flow.

Figure 3:
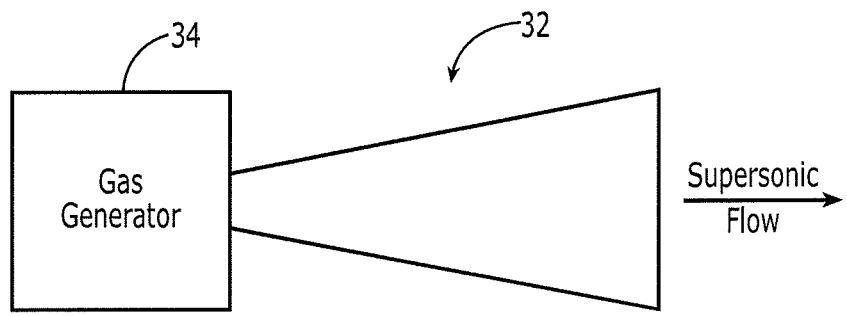
FIG. 3 is a block diagram of an ejector nozzle that may be employed by an apparatus in accordance with one embodiment of the present disclosure.

As described in more detail below and as shown in FIG. 3, an ejector nozzle 32 may include a gas generator 34 for providing the motive flow at a temperature greater than an ambient temperature of the ambient flow. The motive flow may be comprised of a motive gas and a suction gas with the gas generator 34 of various embodiments providing different types of motive gas, including gas, air or steam produced by combustion or peroxide decomposition.

Figure 4:
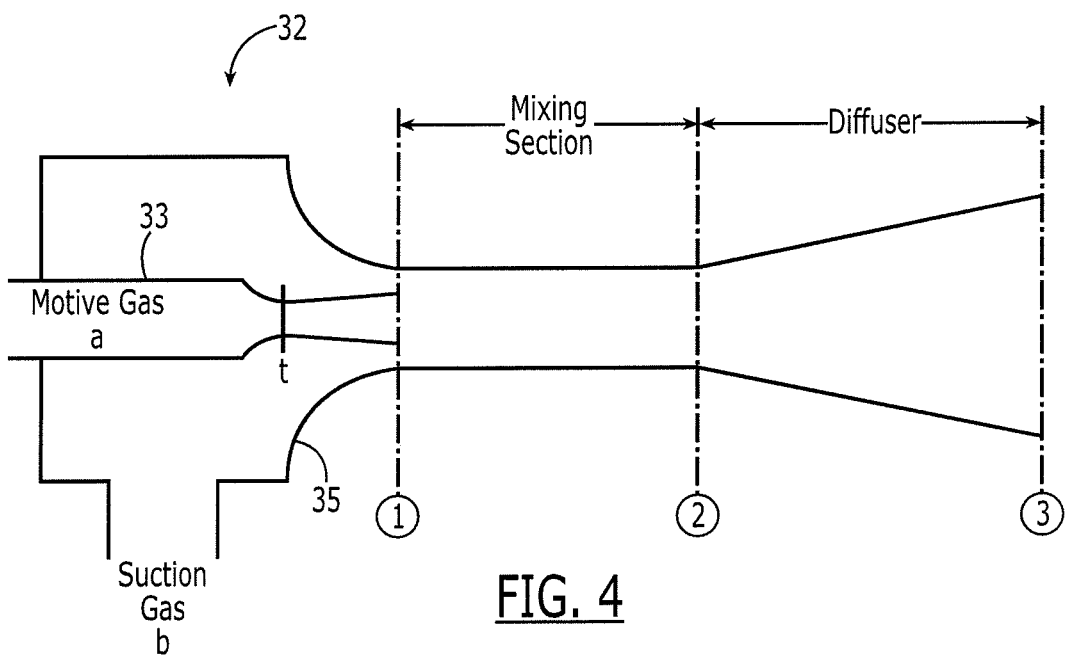
FIG. 4 is a representation of an ejector nozzle that may be utilized by an apparatus in accordance with one embodiment of the present disclosure.
Figure 5:
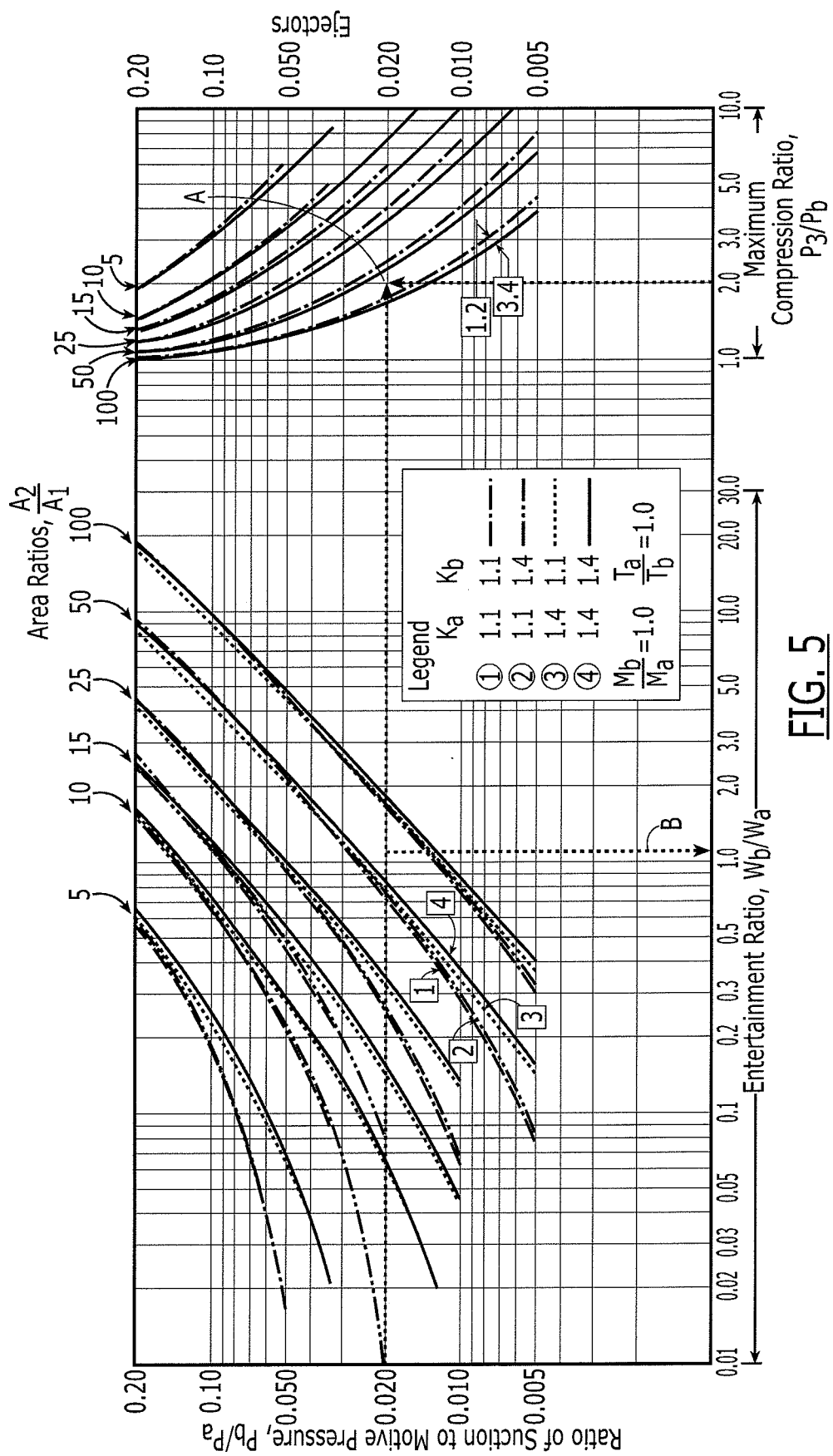
FIG. 5 is a graphical representation of design curves for single stage ejector nozzles.

Referring now to FIG. 4, an ejector nozzle 32 of one embodiment is illustrated. As shown, the ejector nozzle 32 of the illustrated embodiment includes an inner nozzle 33 through which motive gas is introduced and a throat 35 surrounding the inner nozzle through which suction gas is introduced. The motive gas and the suction gas combine to create the motive flow that is provided by the respective ejector nozzle 32. The motive gas and the suction gas that are provided via the inner nozzle 33 and the throat 35, respectively, may be provided at different pressures and temperatures and may have different molecular weights. In one embodiment, these parameters may be defined, at least in part, by the conventional design curves for ejector nozzles shown in FIG. 5 and described by DeFrate and Hoerl, Chem. Eng. Prod., 55, Symp. Ser. 21, 46 (1959). Relative to the nomenclature of the design curves of FIG. 5, the motive gas provided by the inner nozzle 33 of the ejector nozzle 32 may be designated "a", and the suction gas provided by the throat 35 of the ejector nozzle may be designated "b".

As shown in FIG. 4, a mixing section is positioned downstream of the ejector nozzle 32 followed by a diffuser section. In regard to embodiments of the present disclosure, the mixing section is generally proximate to and immediately aft of the turret 12, while the diffuser section is also aft of the turret, but is spaced from the turret in the downstream direction by the mixing section. As will be described in more detail below, the motive flow provided by the ejector nozzle 32 mixes with a portion of the ambient flow and then diffuses so as to return to the pressure of the ambient flow as the combined flow departs the diffuser section.

The combination of the motive flow and a portion of the ambient flow that mixes with the motive flow may achieve supersonic velocities at a reduced pressure compared to the remainder of the ambient flow. As noted above, the combined flow may proceed through a diffuser section which, in one embodiment, is configured such that the cross-sectional area for flow is reduced in a way that causes the flow velocity to be reduced to subsonic. For example, the surface 14 of the aircraft may have a structural modifications, such as a ramp 39 as shown in FIG. 2, that reduce the area available for flow. These modifications may be oriented along the direction of the ambient flow, or may be oriented perpendicular to that direction. The end result of this diffuser section is to return the combined flow to a pressure at least as high as the ambient flow pressure. While this pressure relationship is necessary for ejector operation, a diffuser section is not necessarily required, but a diffuser section may be beneficial in some embodiments for reasons of efficiency in consumption of the media from which the motive flow is created.

By way of example, an aircraft upon which the apparatus 30 of one embodiment of the present disclosure is mounted may be designed for operating at an altitude at which the ambient pressure is 4 pounds per square inch absolute (psia), and the flow can be stabilized around the turret 12 such that flow separation is avoided at a suction pressure of 2 psia, which corresponds to the aircraft operating at a Mach number of approximately 0.7, that is, at a transonic speed. In this regard, the suction pressure is the pressure of the suction gas provided by the throat. In an embodiment at which the motive gas is steam at a pressure of 100 psia, such as may be created by a gas generator 34 and the exit pressure at the exit of the diffuser section is 4 psia so as to merge with the ambient flow at the ambient pressure, the determination of the motive flow may be determined based upon the design curves of FIG. 5.

In this regard, the compression ratio of the pressure at the exit of the diffuser section to the suction pressure may be determined in this embodiment as $p_3/p_b=4$ psia/2 psia=2. Additionally, the ratio of the pressure of the suction gas to the pressure of the motive gas may be determined in this embodiment as $p_b/p_a=2$ psia/100 psia=0.02. With reference to the design curve of FIG. 5, for example, the intersection of the compression ratio $p_3/p_b$ of 2 on the right side of the lower horizontal axis and the suction to motive ratio $p_b/p_a$ of 0.02 on the vertical axis indicates an area ratio of about 80 on the right side of the upper horizontal axis, as indicated by the dashed lines that converge at point A in FIG. 5. In this regard, an area ratio of about 80 indicates that the nozzle area, that is, the area of the openings of the ejector nozzles 32 in the aggregate is about 1/80 of the area of the ambient stream as defined by the total cross-sectional area of the turret 12 that is seen by the ambient stream. Utilizing the area ratio of about 80 on the left side of the upper horizontal axis of the design curves of FIG. 5 and a suction to motive ratio $p_b/p_a$ of 0.02 on the vertical axis, an entrainment ratio on the left side of the lower horizontal axis may be determined to be about 1.1 as indicated by the vertical dashed line B. The entrainment ratio indicates the quantity of fluid, such as air, that can be reduced in pressure to the pressure of the suction gas, that is, to the suction pressure, for every unit of motive gas that is provided. With respect to an entrainment ratio of about 1.1, 1.1 kg of air may be reduced in pressure to 2 psia for every kilogram of steam provided as motive gas at 100 psia.

In one embodiment, a correction factor based upon temperature and molecular weight, may also be utilized to more accurately define the entrainment ratio. In this regard, the correction factor may be determined as $(T_aM_b/T_bM_a)^{1/2}$ where T and M are the temperature and the molecular weight of the motive gas (designated by subscript a) and the suction gas (designated by subscript b). In one embodiment in which $T_a$ and $T_b$ are 500K and 200K, respectively, and $M_a$ and $M_b$ are 18 and 29, respectively, the correction factor is about 2. Thus, the entrainment ratio may be multiplied by the correction factor to determine the quantity of fluid, such as air, that can be reduced in pressure to the pressure of the suction gas, that is, to the suction pressure, per unit of motive gas. For example, in the embodiment in which the entrainment ratio is 1.1 and the correction factor is 2, 2.2 kg of air may be evacuated per kilogram of steam.

By way of example, ambient flow for a turret 12 having a frontal area of about 0.5 meters×0.5 meters at a Mach number of 0.7 is about 10 kg/sec. In order to provide sufficient motive flow to eliminate the flow separation, the gas generator 34 will be required to produce about 4.5 kg/s (10 kg/sec/2.2) of motive gas, a quantity that may be readily produced.

The ejector nozzles 32 may have various sizes depending upon the application, but, in one embodiment, the apparatus 30 may include a relatively large number of ejector nozzles, with each ejector nozzle being relatively small. In this regard, the motive flow provided by an ejector nozzle 32 typically requires a flow length in the predefined flow direction equal to about ten times the diameter of the ejector nozzle at its opening through the surface 14 to recover to subsonic conditions. As a number applications, including some applications for the apparatus 30 on aircraft, are constrained by space, it may be beneficial in these embodiments to include more ejector nozzles 32, but smaller ejector nozzles, so as to reduce the space required for recovery to subsonic conditions.

Figure 6:
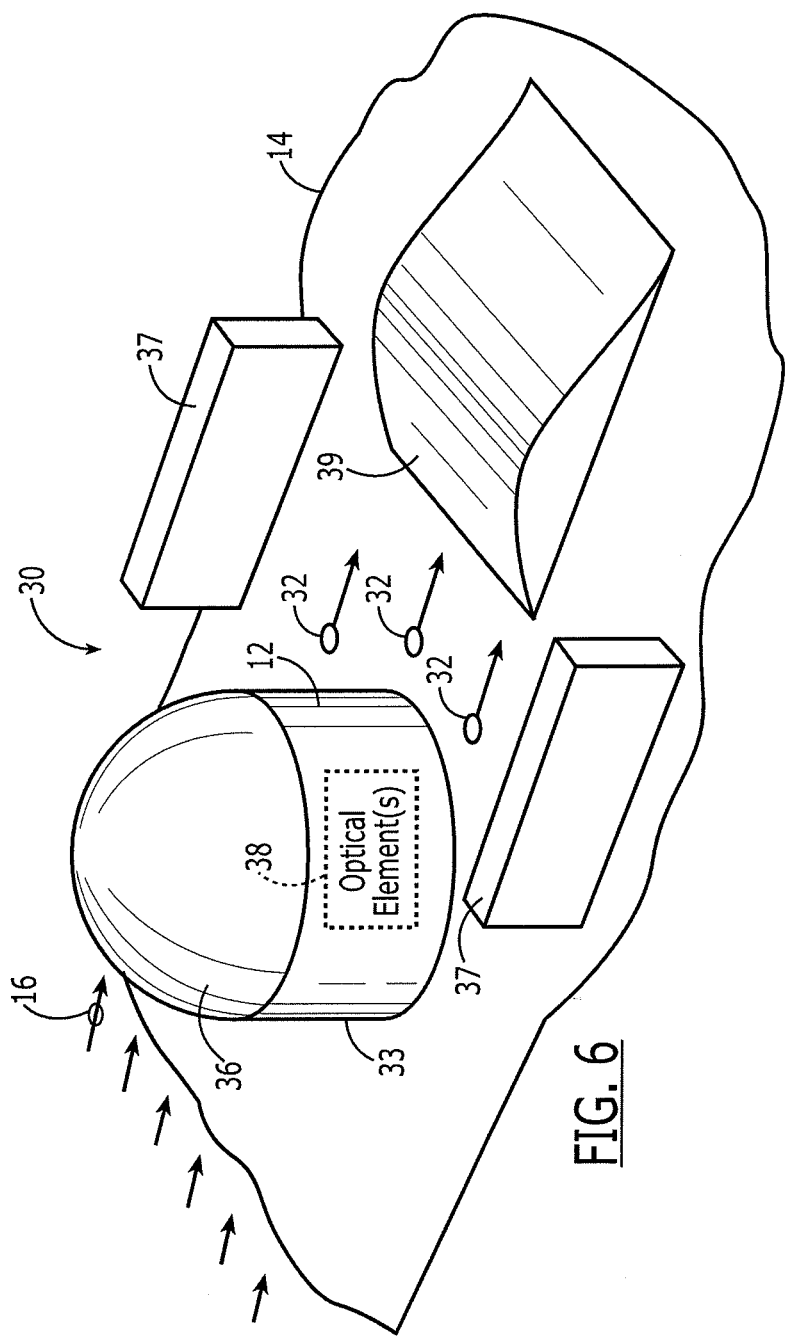
FIG. 6 is a perspective view of an apparatus in accordance with another embodiment of the present disclosure.

As described above, it is desirable for the motive flow provided by the ejector nozzles 32 mix with a portion of the ambient flow in a mixing region aft of the turret 12. In this regard, it is generally desirable for the motive flow to mix with the portion of the ambient flow that flows around, e.g., proximate to, the turret 12 and, in particular, the portion of the ambient flow that flows over the hemispherical portion 36 of the turret 12 since this portion of the ambient flow may be most effective in preventing separation of the flow from the turret. As a result of the reduced pressure created in the mixing region aft of the turret 12, other portions of the ambient flow may pour into the mixing regions from outboard of the turret area. While the other portions of the ambient flow may also mix with the motive flow within the mixing region, these other portions of the ambient flow are not as effective in reducing or eliminating flow separation and, instead, generally causes the ejector nozzles 32 to be less effective in creating a vacuum and/or causes the ejector nozzles to be sized larger and to use more motive gas. In order to further improve the pressure recovery to subsonic conditions, the apparatus 30 may therefore also include one or more of a flow splitter, a shield and/or other barrier 37 aft of the turret 12 that serves to provide some degree of isolation to the region on the aft side of the turret and to limit the inflow of other portions of the ambient flow from regions outboard of the turret into the mixing region of reduced pressure. See, for example, FIG. 6. By limiting the inflow of air from regions outboard of the turret, the flow rate requirements may be reduced which, in turn, may permit the size of the ejector nozzles 32 to be reduced, thereby requiring less space for recovery to subsonic conditions.

Figure 7:
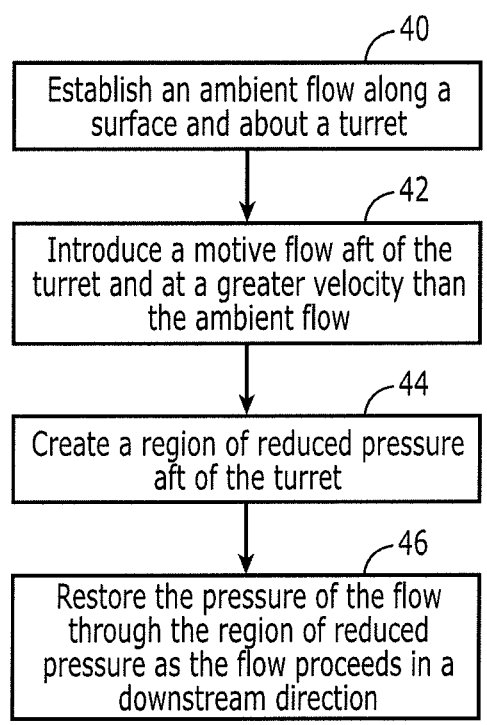
FIG. 7 is a flowchart of the operations performed in accordance with a method of one embodiment of the present disclosure.

As described above and as shown in FIG. 7, once an ambient flow has been established along a surface 14 and about a turret 12, embodiments of the present disclosure may introduce a motive flow aft of the turret that has a greater velocity than the ambient flow. See operations 40 and 42. This motive flow may create a region of reduced pressure aft of a turret 12 so as to prevent or reduce flow separation and the concomitant turbulence which may effect performance of the system housed by the turret, such as by altering laser beam propagation therethrough. See operation 44 of FIG. 7. Once the region of reduced pressure has been created aft of the turret 12, the pressure of the gas flowing through the reduced pressure region may be restored to at least as high of a pressure as the ambient pressure of the ambient flow to ensure that the flow is stable and continues along the surface 14. See operation 46 of FIG. 7. In the embodiment described above, the region of reduced pressure may be created by an ejector nozzle 32 having a gas generator 34 for providing a motive flow at an elevated temperature that creates a supersonic flow. The supersonic flow generated by the ejector nozzle 32 and the subsonic flow of a portion of the ambient flow about the turret 12 may merge so as to flow along the surface 14. This merging will cause the motive flow provided by the ejector nozzles 32 to undergo a conversion to subsonic flow with its increased pressure. Thus, the region of reduced pressure may prevent or reduce flow separation aft of the turret 12 while facilitating the continued ambient flow along the surface 14. While useful in a number of environments, the apparatus 30 of embodiments of the present disclosure are particularly useful in conjunction with transonic ambient flows as noted above.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for controlling flow comprising:
    a turret extending outwardly from a surface and into an ambient flow that propagates in a predefined flow direction relative to the surface and the turret; and
    a plurality of ejector nozzles opening through the surface and positioned aft of the turret relative to the ambient flow in a region that would experience flow separation due to the turret without the ejector nozzles, wherein the plurality of ejector nozzles are configured to introduce a motive flow having a greater velocity than the ambient flow to thereby create a mixing region aft of the turret of reduced pressure relative to an ambient pressure in which a portion of the ambient flow mixes with the motive flow, wherein each ejector nozzle comprises an inner nozzle through which motive gas is introduced and a throat surrounding the inner nozzle through which suction gas is introduced at a different pressure than the motive gas such that the motive gas and the suction gas combine to create the motive flow, and wherein the ejector nozzle including the throat and the inner nozzle extend to the surface and open into the mixing region aft of the turret.

2. An apparatus according to claim 1 wherein each ejector nozzle comprises a gas generator for providing motive gas at a temperature greater than an ambient temperature of the ambient flow.

3. An apparatus according to claim 1 wherein the inner nozzle and the throat are configured such that the motive gas has a greater temperature and a lower molecular weight than the suction gas.

4. An apparatus according to claim 1 wherein the ambient flow is transonic, and wherein the plurality of ejector nozzles is configured to introduce the motive flow at a supersonic velocity.

5. An apparatus according to claim 1 further comprising a flow redirector positioned aft of the turret and extending outwardly from the surface.

6. An apparatus according to claim 5 wherein the flow redirector comprises a ramp having an outer surface over which the flow passes, wherein the outer surface has a width that that is greater than a spacing between two adjacent nozzles so as to span at least the two ejector nozzles.

7. An apparatus for controlling flow comprising:
    a turret extending outwardly from a surface and into an ambient flow that propagates in a predefined flow direction relative to the surface and the turret;
    one or more components of a laser system disposed within the turret; and
    a plurality of ejector nozzles opening through the surface and positioned aft of the turret relative to the ambient flow in a region that would experience flow separation due to the turret without the ejector nozzles, wherein the plurality of ejector nozzles are configured to introduce a motive flow having a greater velocity than the ambient flow to thereby create a mixing region aft of the turret of reduced pressure relative to an ambient pressure, wherein each ejector nozzle comprises an inner nozzle through which motive gas is introduced and a throat surrounding the inner nozzle through which suction gas is introduced at a different pressure than the motive gas such that the motive gas and the suction gas combine to create the motive flow, and wherein the ejector nozzle including the throat and the inner nozzle extend to the surface and open into the mixing region aft of the turret.

8. An apparatus according to claim 7 wherein each ejector nozzle comprises a gas generator for providing motive gas at a temperature greater than an ambient temperature of the ambient flow.

9. An apparatus according to claim 7 wherein the inner and outer nozzles are configured such that the motive gas has a greater temperature and a lower molecular weight than the suction gas.

10. An apparatus according to claim 7 wherein the ambient flow is transonic, and wherein the plurality of ejector nozzles is configured to introduce the motive flow at a supersonic velocity.

11. An apparatus according to claim 7 further comprising a flow redirector positioned aft of the turret and extending outwardly from the surface.

12. An apparatus according to claim 11 wherein the flow redirector comprises a ramp having an outer surface over which the flow passes, wherein the outer surface has a width that that is greater than a spacing between two adjacent nozzles so as to span at least the two ejector nozzles.

13. A method for controlling flow comprising:
establishing an ambient flow that propagates in a predefined flow direction about a turret that extends outwardly from a surface and into the ambient flow; and
introducing a motive flow from a plurality of ejector nozzles that open through the surface and are positioned aft of the turret relative to the ambient flow in a region that would experience flow separation due to the turret without the ejector nozzles, wherein the motive flow has a greater velocity than the ambient flow to thereby create a mixing region aft of the turret of reduced pressure relative to an ambient pressure in which a portion of the ambient flow mixes with the motive flow, wherein introducing the motive flow comprises introducing a motive gas through an inner nozzle of each ejector nozzle and introducing a suction gas through a throat of each ejector nozzle that surrounds the respective inner nozzle, and wherein the suction gas is introduced at a different pressure than the motive gas such that the motive gas and the suction gas combine to create the motive flow, and wherein the ejector nozzle including the throat and the inner nozzle extend to the surface and open into the mixing region aft of the turret.

14. A method according to claim 13 wherein introducing the motive gas comprises providing motive gas at a temperature greater than an ambient temperature of the ambient flow.

15. A method according to claim 13 wherein introducing the motive gas and the suction gas comprises introducing the motive gas with a greater temperature and a lower molecular weight than the suction gas.

16. A method according to claim 13 wherein establishing the ambient flow comprises establishing the ambient flow to be transonic, and wherein introducing the motive flow comprises introducing the motive flow at a supersonic velocity.

17. A method according to claim 13 further comprising housing one or more components of a laser system within the turret.

18. A method according to claim 13 further comprising reducing a pressure of the flow downstream of the mixing region by causing the flow to pass over an outer surface of a ramp, wherein the outer surface has a width that that is greater than a spacing between two adjacent nozzles so as to span at least the two ejector nozzles.

\* \* \* \* \*